United States Patent
Lin et al.

(10) Patent No.: US 7,676,197 B2
(45) Date of Patent: Mar. 9, 2010

(54) SIGNAL SPECTRUM STEERING METHOD, APPARATUS, AND SYSTEM

(75) Inventors: Xintian E. Lin, Mountain View, CA (US); Qinghua Li, Sunnyvale, CA (US); Lei Shao, Santa Clara, CA (US); Allen W. Bettner, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 1015 days.

(21) Appl. No.: 11/173,879

(22) Filed: Jun. 30, 2005

(65) Prior Publication Data

US 2007/0004339 A1 Jan. 4, 2007

(51) Int. Cl.
*H04B 1/00* (2006.01)
*H04B 15/00* (2006.01)

(52) U.S. Cl. ............ 455/63.3; 455/63.1; 455/455; 455/67.13; 455/556.2; 455/557; 375/132; 375/340; 375/362

(58) Field of Classification Search ............ 455/63.3, 455/63.1, 67.13, 556.2, 557; 375/132, 346, 375/362
See application file for complete search history.

(56) References Cited

U.S. PATENT DOCUMENTS

| | | | | |
|---|---|---|---|---|
| 4,229,699 A | * | 10/1980 | Frissell | 327/114 |
| 4,905,305 A | * | 2/1990 | Garner et al. | 455/183.2 |
| 5,263,055 A | * | 11/1993 | Cahill | 375/346 |
| 5,926,514 A | * | 7/1999 | Meador et al. | 375/346 |
| 5,943,382 A | * | 8/1999 | Li et al. | 375/376 |
| 6,240,123 B1 | * | 5/2001 | Zhang et al. | 375/130 |
| 6,252,464 B1 | * | 6/2001 | Richards et al. | 331/4 |
| 6,263,192 B1 | * | 7/2001 | Alderton | 455/73 |
| 6,438,577 B1 | * | 8/2002 | Owens | 709/203 |
| 6,597,226 B1 | * | 7/2003 | Eade et al. | 327/292 |
| 6,643,317 B1 | * | 11/2003 | Blumer | 375/130 |
| 6,647,052 B2 | * | 11/2003 | Hailey | 375/130 |
| 6,658,043 B2 | * | 12/2003 | Hardin et al. | 375/130 |
| 6,665,019 B1 | * | 12/2003 | Pronkine | 348/540 |
| 6,703,902 B2 | * | 3/2004 | Jeon et al. | 331/17 |
| 6,980,581 B1 | * | 12/2005 | Sha et al. | 375/130 |
| 6,990,163 B2 | * | 1/2006 | Williams | 375/376 |
| 6,993,109 B2 | * | 1/2006 | Lee et al. | 375/376 |
| 6,993,987 B2 | * | 2/2006 | Komura | 73/866.1 |
| 6,999,723 B2 | * | 2/2006 | Kusbel et al. | 455/63.1 |
| 7,010,271 B2 | * | 3/2006 | Melanson | 455/71 |

(Continued)

FOREIGN PATENT DOCUMENTS

WO    WO-0211452 A1    2/2002

OTHER PUBLICATIONS

PCT Serial No. PCT/US2006/025947; Filed: Jun. 29, 2006; Search Report & Written Opinion mailed Nov. 27, 2006, 14 pgs.

(Continued)

*Primary Examiner*—Marceau Milord
(74) *Attorney, Agent, or Firm*—Dana B. LeMoine; LeMoine Patent Services, PLLC (57) ABSTRACT

A computing platform includes a wireless interface and other devices that may cause interference to the wireless interface. The other devices may change frequencies of operation or data rates to steer signal spectrum away from current wireless channels and reduce interference to the wireless interface.

19 Claims, 9 Drawing Sheets

U.S. PATENT DOCUMENTS

| | | | |
|---|---|---|---|
| 7,028,097 B2 * | 4/2006 | Bard | 709/232 |
| 7,079,616 B2 * | 7/2006 | Castiglione et al. | 375/376 |
| 7,177,643 B2 * | 2/2007 | Howard | 455/445 |
| 7,203,785 B2 * | 4/2007 | Bennett et al. | 710/302 |
| 7,286,850 B2 * | 10/2007 | Frielink et al. | 455/557 |
| 2003/0039330 A1 * | 2/2003 | Castiglione et al. | 375/376 |
| 2003/0100280 A1 | 5/2003 | Kusbel et al. | |
| 2003/0198307 A1 * | 10/2003 | Neill et al. | 375/346 |
| 2005/0013343 A1 * | 1/2005 | Giunco et al. | 375/130 |

OTHER PUBLICATIONS

Bolger, S., et al., "Use Spread-spectrum techniques to reduce EMI", *EDN Electrical Design News; Reed Business Info.*; Highlands Ranch, CO: 43(11), (May 21, 1998), 141, 142, 144, 146, 148.

* cited by examiner

SIGNAL SPECTRUM STEERING METHOD, APPARATUS, AND SYSTEM

FIELD

The present invention relates generally to wireless communications, and more specifically to reducing interference to wireless communications.

BACKGROUND

Many computing platforms include wireless communications capability. For example, many desktop computers, laptop computers, handheld devices, and other computing platforms include wireless communications capability. With the advance of manufacturing processes and digital architectures, the performance of wireless receivers has improved significantly. For example, in many wireless receivers, receiver sensitivity is approaching the thermal noise floor.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
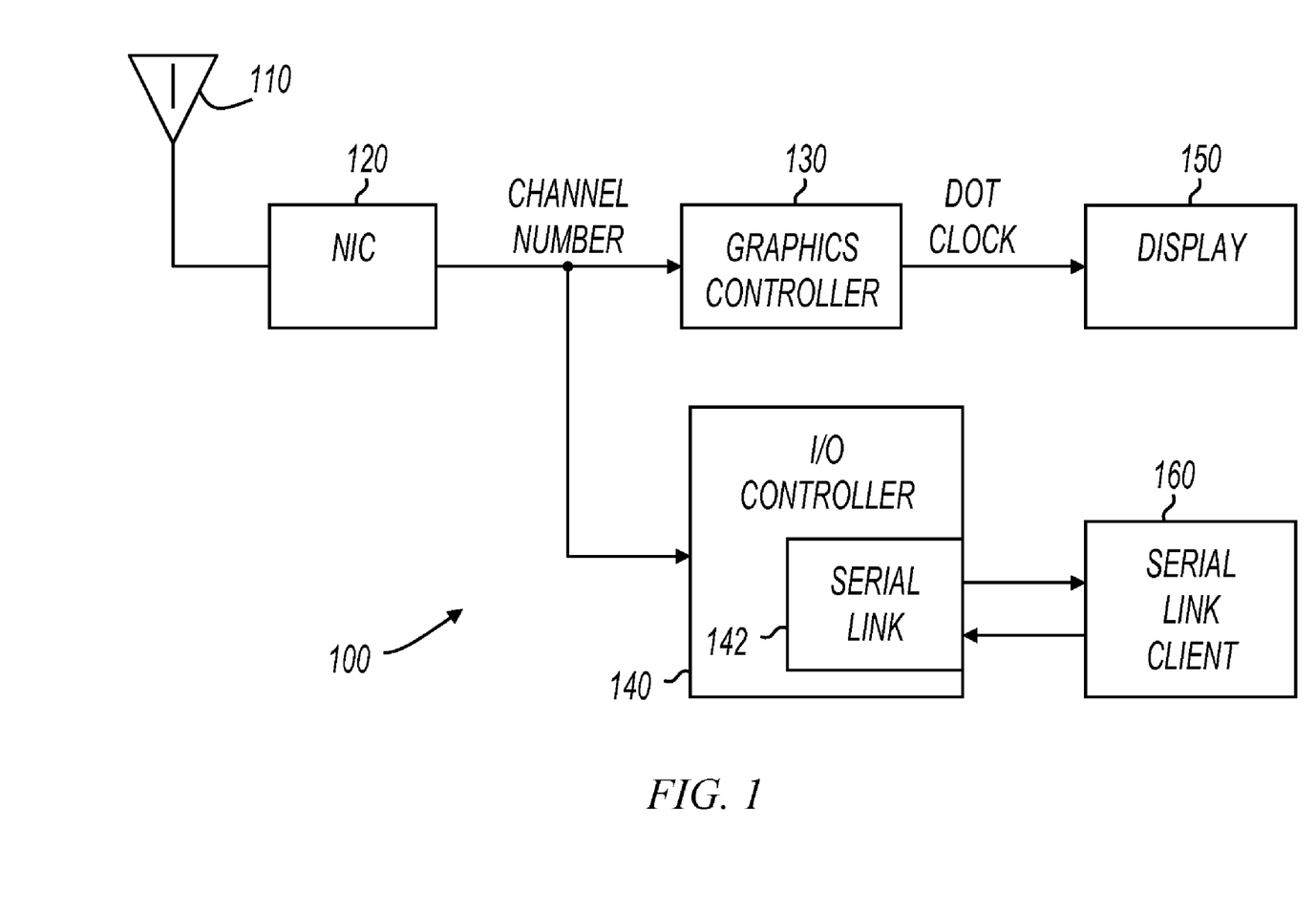
FIG. 1 shows a diagram of a computing platform with wireless communications capabilities.

FIG. 1 shows a diagram of a computing platform with wireless communications capabilities. Computing platform 100 includes antenna 110, network interface card (NIC) 120, graphics controller 130, display 150, input/output (I/O) controller 140 with serial link 142, and serial link client 160. Computing platform 100 may be any type of computing platform having wireless communications capabilities. For example, computing platform 100 may be a desktop computer, a laptop computer, a cellular phone, a personal digital assistant (PDA) or any other type of device having wireless communications capabilities.

In some embodiments, computing platform 100 may operate in compliance with, or in partial compliance with, a wireless local area network (WLAN) standard, wireless wide area network (WWAN) standard, or other standard. For example, computing platform 100 may operate in compliance with a standard such as IEEE Std. 802.11, 1999 Edition, although this is not a limitation of the present invention. As used herein, the term "802.11" refers to any past, present, or future IEEE 802.11 standard, including, but not limited to, the 1999 edition. Also for example, computing platform 100 may operate in compliance with other standards such as IEEE 802.15, 802.15, 802.20, or others. Further, in some embodiments, computing platform 100 does not operate in compliance with a standard.

Network interface card (NIC) 120 provides wireless connectivity for computing platform 100. For example, NIC 120 may send and receive data on a wireless network using antenna 110. Wireless communications may take place in any frequency band(s). For example, communications may take place in 800, 900, 1800, or 1900 MHz bands, or 2.4-2.5, or 5.15-5.8 GHz bands. A processor (not shown) or other subsystem (not shown) in computing platform 100 may communicate with NIC 120 to effect the wireless communications.

As shown in FIG. 1, in some embodiments, computing platform 100 utilizes a NIC for wireless connectivity. This may correspond to a card inserted in a card slot in computing platform 100 or a peripheral device coupled through another interface such as universal serial bus (USB). In some embodiments, computing platform 100 may have wireless communications capability without NIC 120. For example, computing platform 100 may be a notebook computer having a chipset with built-in wireless connectivity capability. The various embodiments of the present invention are not limited by the location or type of mechanism that provides wireless communications capability.

Graphics controller 130 communicates with display 150 to display data that may be useful to a user of computing platform 100. For example, in some embodiments, display 150 may be a display in a laptop computer, and graphics controller 130 may control the display of information for a laptop computer. Also for example, in some embodiments, display 150 may be a display in a handheld device such as a cellular phone, and graphics controller 130 may control the display of information for a cellular phone. The present invention is not limited by the type of data displayed by graphics controller 130. Display 150 may be any type of display. For example, in some embodiments, display 150 may be a liquid crystal display (LCD) controlled by graphics controller 130.

In some embodiments, graphics controller 130 may source a pixel clock, or "dot clock," to display 150. For example, a dot clock may be provided that has a frequency substantially equal to the rate at which pixels on display 150 are displayed. The dot clock may interfere with wireless communications.

For example, harmonics of the dot clock may appear in spectrum used by NIC 120. To reduce interference, graphics controller 130 may provide a dot clock that hops or slews between two or more frequencies. The frequencies used for the dot clock may be chosen based at least in part on the current frequency, or "channel," used by NIC 120. A channel number may be provided to graphics controller 130 by NIC 120. Frequency hopping dot clock embodiments are described further below under the heading "Frequency Hopping Pixel Clock."

Input/output (I/O) controller 140 provides connectivity between various components of computing platform 100. For example, I/O controller 100 may provide connectivity between a processor (not shown) and serial link client 160 using serial link 142. In some embodiments, serial link 142 may implement one or more peripheral component interconnect (PCI) Express point-to-point links to communicate with serial link client 160.

Serial link 142 and/or serial link client 160 may interfere with wireless communications. For example, signal energy produced by a serial data signal may appear in spectrum used by NIC 120. To reduce interference, I/O controller 140 may vary a data rate of a serial data signal. The data rate used for serial data may be chosen based at least in part on the current frequency, or "channel," used by NIC 120. A channel number may be provided to graphics controller 130 by NIC 120. Variable serial data rate embodiments are described further below under the heading "Variable Serial Data Rate."

Frequency Hopping Pixel Clock

As described above, a dot clock may be a source of platform noise in a computing platform. Dot clocks may vary in frequency. For example, in some embodiments, dot clocks may be between 40-120 MHz depending on the screen resolution and refresh rate, and harmonics of the dot clock can land in a channel in which a NIC is operating. Further, a NIC (or other type of WLAN radio) may periodically scan an entire band such as the whole Industrial/Scientific/Medical (ISM) band between 2400-2485 MHz to build a database of other access points (APs) in the neighborhood. This scanning feature may be useful when a mobile station with a WLAN card roams to the best access point in a dynamically changing WLAN environment. Accordingly, a dot clock may interfere with a wireless device not just in the current channel, but in other channels when the wireless device performs a channel scan.

Figure 2:
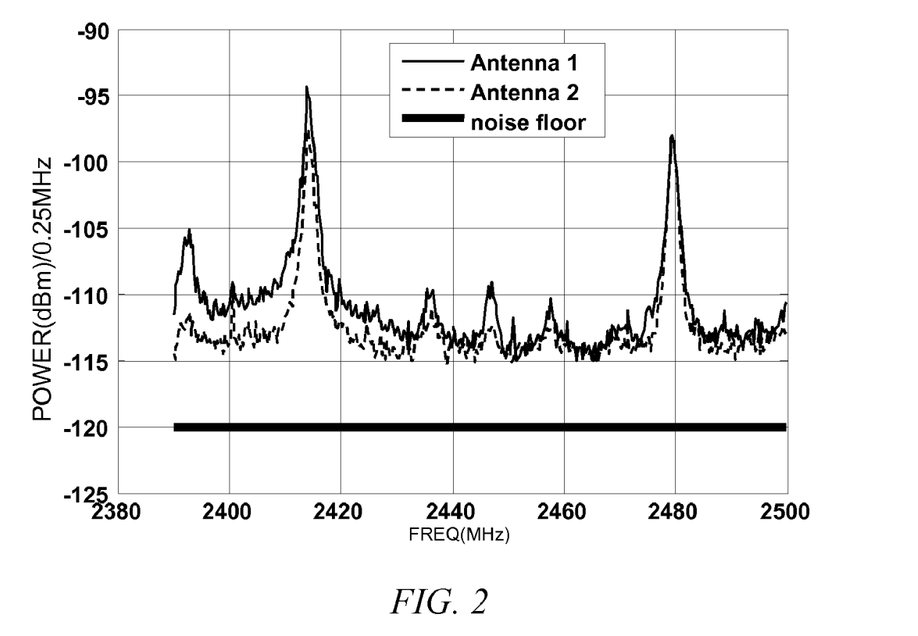
FIG. 2 shows noise power measured on a notebook computer.
Figure 3:
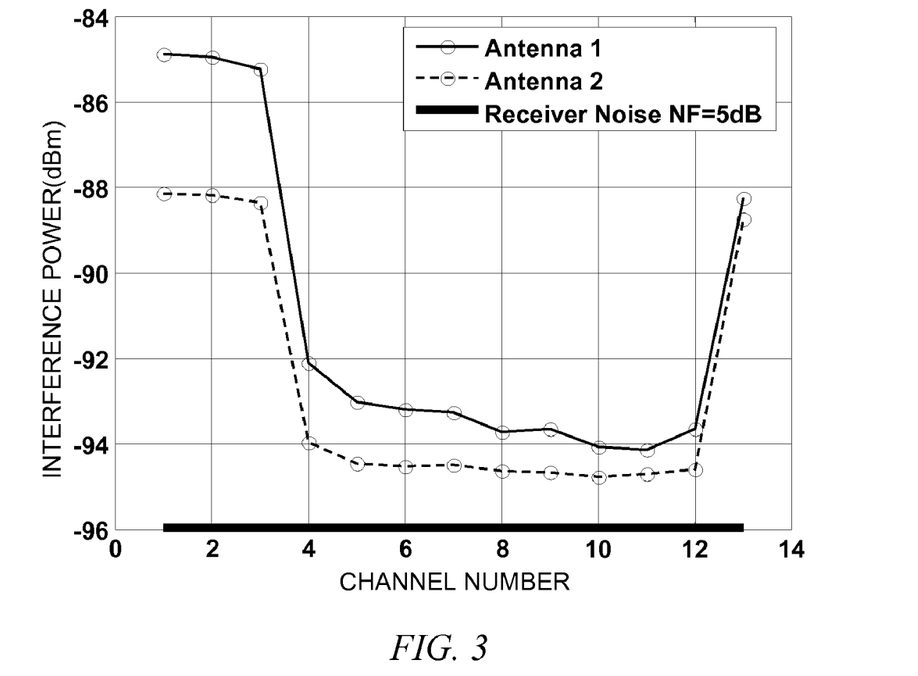
FIG. 3 shows channel noise power in the 2.4-2.5 GHz band.

FIG. 2 shows noise power measured on a notebook computer (IBM T40) having a dot clock frequency of 65.24 MHz. As shown in FIG. 2, major peaks occur at the $37^{th}$ (~2412 MHz) and $38^{th}$ (~2478 MHz) harmonics of the 65.24 MHz dot clock. In some embodiments, the dot clock is not symmetric, so both even and odd harmonics are present. FIG. 3 shows channel noise power in the 2.4-2.5 GHz band. As shown in FIG. 3, the channel noise power may be as much as 10 dB higher than the channels without the dot clock harmonics.

Various embodiments of the present invention provide a mechanism to select a dot clock to reduce interference caused to a wireless radio. A graphics controller may select dot clock frequencies and change the dot clock according to the current radio frequency channel in order to move the harmonics away from the current channel. For example, if the dot clock has a frequency of 43 MHz, and the NIC is communicating in channel 1 (2412+/−10 MHz) of the 2.4-2.5 GHz band, by changing the dot clock from 43 MHz to 44 MHz, the 56th harmonics moves from 2408 MHz to 2464 MHz.

In addition to selecting one dot clock frequency, various embodiments of the present invention provide an adaptive frequency hopping dot clock to reduce interference further. In some embodiments, two dot clock frequencies are chosen such that the two sets of harmonics avoid the current channel altogether and no other channel contains harmonics from both dot clock frequencies. In the example dot clock selection of the previous paragraph, the interference to channel 1 is reduced, but channel 11 centered at 2462 MHz will be subjected to interference by the 56th harmonic of the 44 MHz dot clock. A second dot clock frequency may be chosen, where harmonics of the second dot clock avoid both channel 1 and channel 11. The graphics controller may then change, or "hop," the dot clock between these two frequencies.

In some embodiments, the dot clock may be continuously changed (or "slewed") between the two frequencies rather than being hopped. In these embodiments, the two frequencies are chosen such that the harmonics of the continuous bands generated by the slewing action avoid the current channels.

In some embodiments, more than two dot clock frequencies are chosen. This description is simplified by only treating two dot clock frequencies in detail, however, it is understood that the various embodiments of the invention apply to more than two dot clock frequencies.

The following function "Twofreq" may be used to generate two dot clock frequencies (f1, f2) from a channel number m and a dot clock frequency f0:

Function [f1, f2]=Twofreq(m, f0)
  Fc=2412+(m−1)*5; % center frequency of the channel, in MHz
  h_m=round(fc/f0); % harmonic index
  f1=(Fc−f0/2)/h_m;
  f2=(fc+f0/2)/h_m;
end The Twofreq function is one example of how various embodiments of the present invention may find two frequencies f1 and f2 that are close to the original dot clock freq f0. In some embodiments, f1 and f2 may be limited to a pre-selected frequency set. This may simplify phase lock loop (PLL) design.

Figure 4:
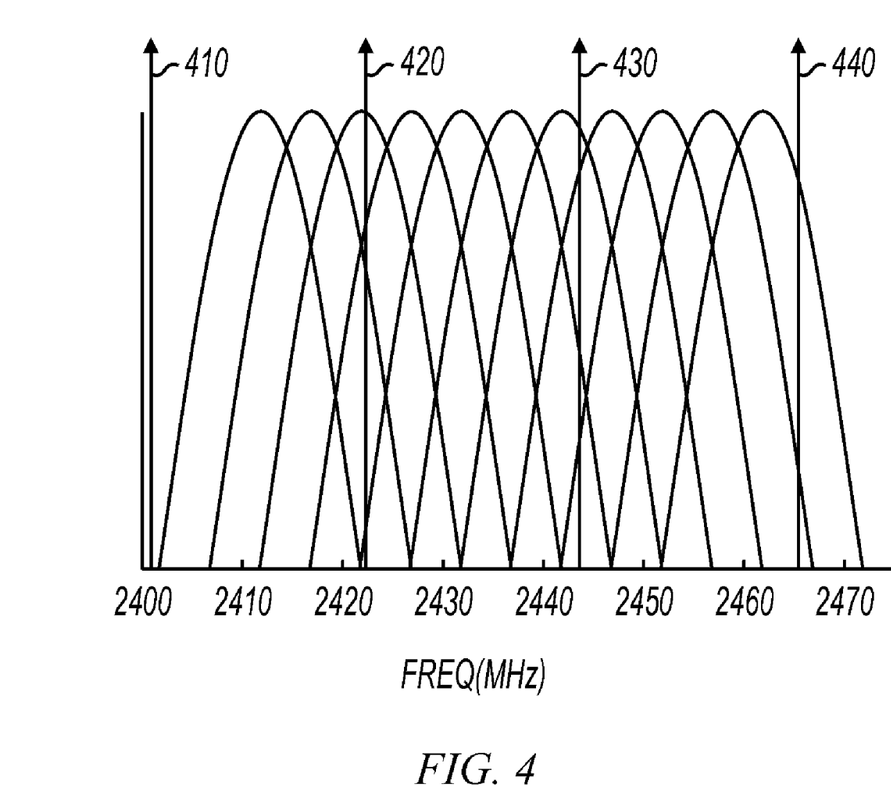
FIG. 4 shows a plot of wireless spectrum and harmonics of two dot clock hopping frequencies.

FIG. 4 shows a plot of wireless spectrum and harmonics of two dot clock hopping frequencies. The spectrum curves in FIG. 4 represent the spectrum of wireless channels 1-11 in the 2.4-2.5 GHz band. Spectral lines 410, 420, 430, and 440 represent harmonics of f1 and f2 that are generated by Twofreq(1, 43). For example, spectral lines 420 and 440 represent harmonics of f1, and spectral lines 410 and 430 represent harmonics of f2. As shown in FIG. 4, all dot clock harmonics are outside channel 1, the current channel; and no channel is interfered by harmonics from both f1 and f2.

In some embodiments, the dot clock hopping frequency is related to a scanning frequency of the wireless radio. For example, in some embodiments, a WLAN radio may scan the channels at a particular scanning rate (e.g., once every minute). In these embodiments, a graphics controller may set a dot clock hopping rate to a rate other than sub-harmonics of the scanning rate to avoid synchronization with WLAN scanning.

To avoid any display glitches when the dot frequency is changed, a PLL that generates the dot clocks may start changing frequency when the display is in the blank period. In some embodiments, a 1024×768 display may have more than 2 ms blanking period in each frame, which is enough for the clock to settle to the new frequency. Alternatively, the dot clock can be slowly slewed between f1 and f2 continuously.

Variable Serial Data Rate

As described above, a high speed serial link may be a source of platform noise in a computing platform. Various embodiments of the present invention modify a data rate of a high speed serial link to reduce interference to wireless communications. Various embodiments of the present invention are described with reference to peripheral component interconnect (PCI) Express point-to-point serial links, but this is not a limitation of the present invention. Any type of high speed serial link may be utilized without departing from the scope of the present invention. Further, parallel links may be a source of platform noise, and the various embodiments of the present invention also apply to parallel links.

Figure 5:
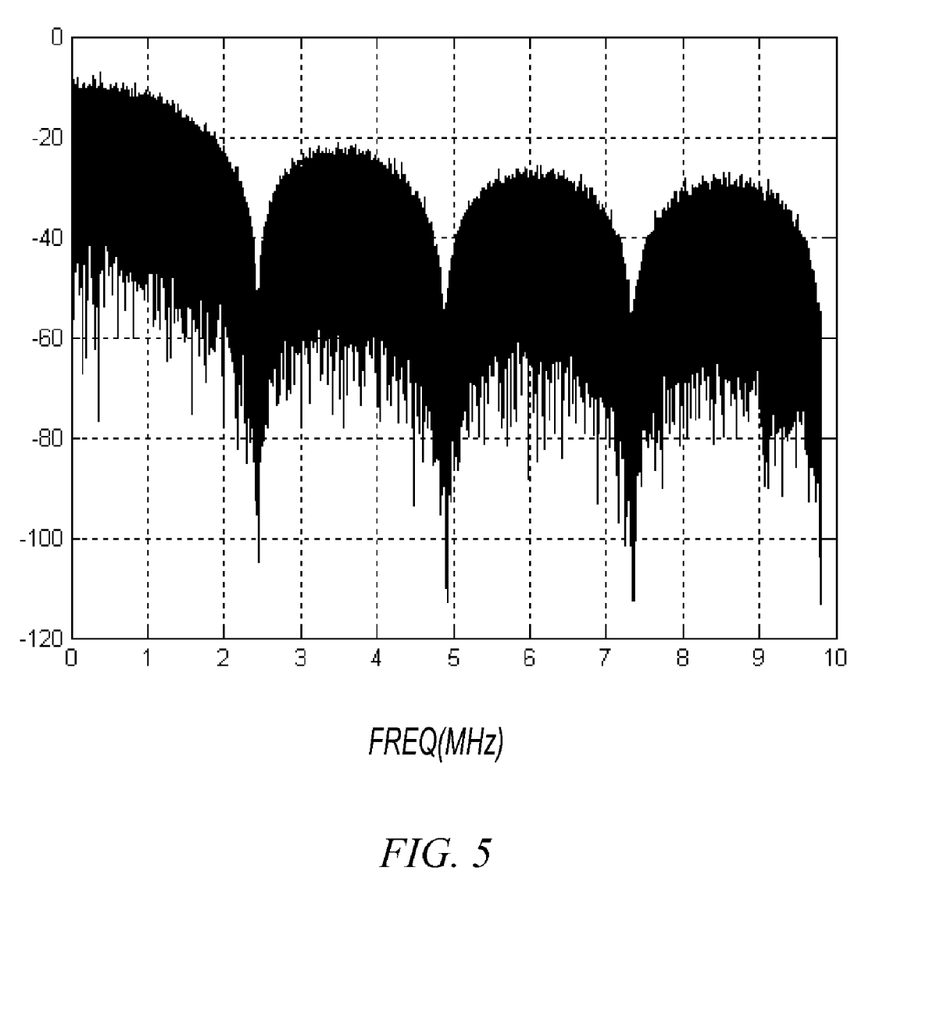
FIG. 5 shows a spectrum density plot for PCI Express signals.

FIG. 5 shows a spectrum density plot for PCI Express signals. As shown in FIG. 5, the PCI Express spectrum has a characteristic shape of sinc(x), where the nulls occur at multiples of the data rate. The first generation of PCI Express has a data rate of 2.5 Gbps. Accordingly, the data line spectrum may reach to 5-6 GHz and higher.

The plot shown in FIG. 5 represents the spectral density of the un-spread clock at 2.5 GHz, and the spectral density of the spread spectrum clock with −0.5% down spreading. Various embodiments of the present invention modify the serial data to "steer" a spectral null into the band of interest to reduce the amount of noise into the wireless receiver. For example, a PCI Express master inside an I/O controller may read the WLAN channel information and change the PCI Express clock frequency to steer the null into the center of the channel. Once the master sets the clock and data rate, the client device will follow and both uplink and downlink will generate low in-band noise.

Figure 6:
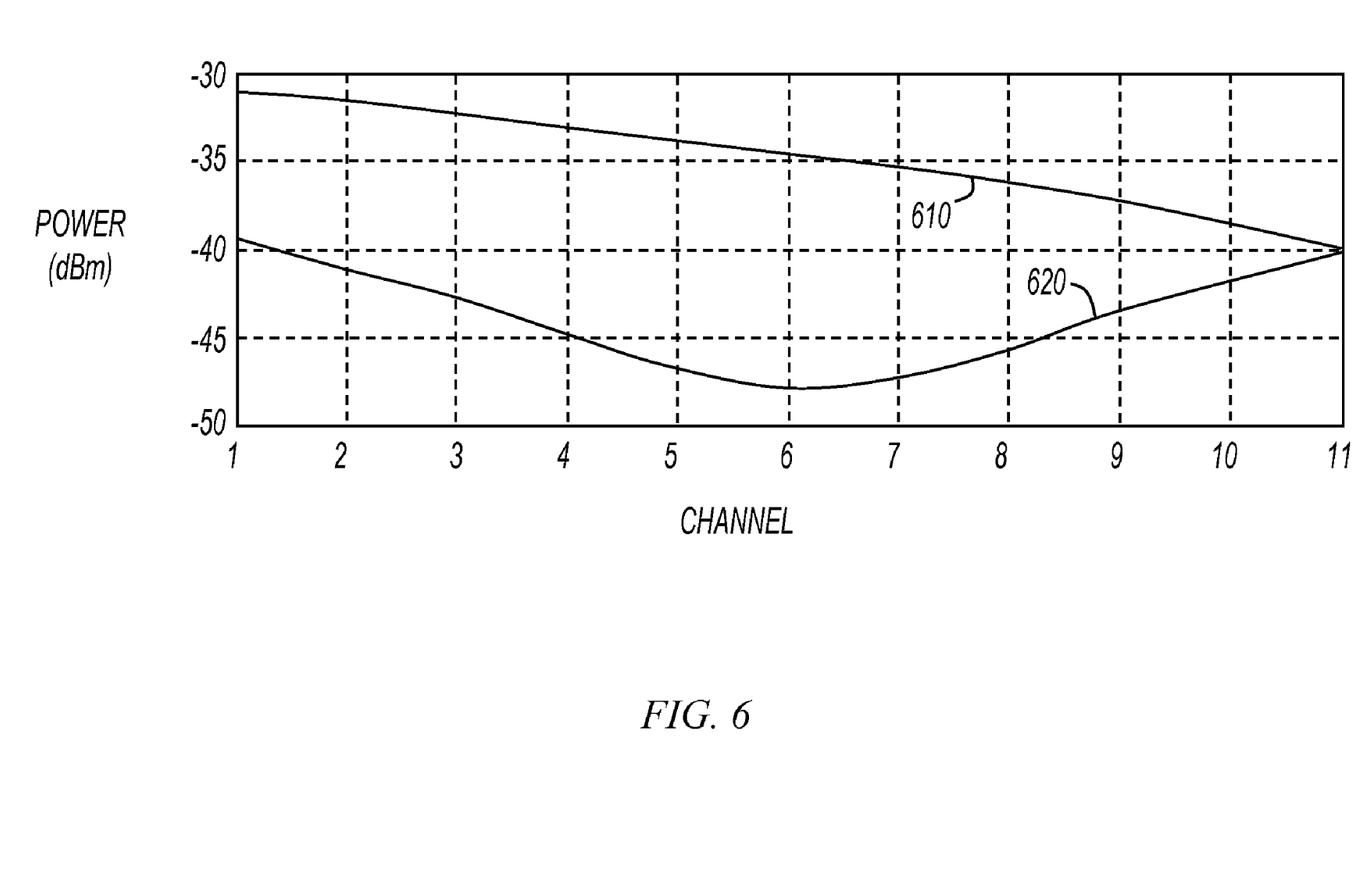
FIG. 6 shows wireless channel noise power for two serial link data rates.

In some embodiments, the clock frequency may be moved from 2.5 GHz down to 2.45 GHz to take advantage of the spectral null for 802.11b/g operation in the ISM band from 2.4-2.485 GHz. FIG. 6 shows wireless channel noise power for two serial link data rates. Curve 610 shows noise power for a PCI Express data rate of 2.5 Gbps, and curve 620 shows noise power for a PCI Express data rate of 2.45 Gbps. The average channel noise power is −34.1 dBm for curve 610, and −42.9 dBm for curve 620. The difference is 8.8 dB.

In some embodiments, a different serial link data rate is selected for each of the wireless channels in the ISM band. For example, the PCI Express frequency may be tailored for individual ISM band channels. For example, at channel 1, the center frequency is 2.412 GHz. The PCI Express data rate may be set to 2.424 Gbps for channel 1, and after −0.5% down spreading, the null will shift to the center of channel 1.

The resulting noise power is tabulated and shown below in Table 1. The individual PCI Express frequencies for channel 1-11 are 2424+5*(ch−1) MHz, where ch is the channel number. In embodiments with individual PCI Express frequencies for each wireless channel, the average noise reduction, i.e. gain, increases to 13.5 dB.

Figure 7:
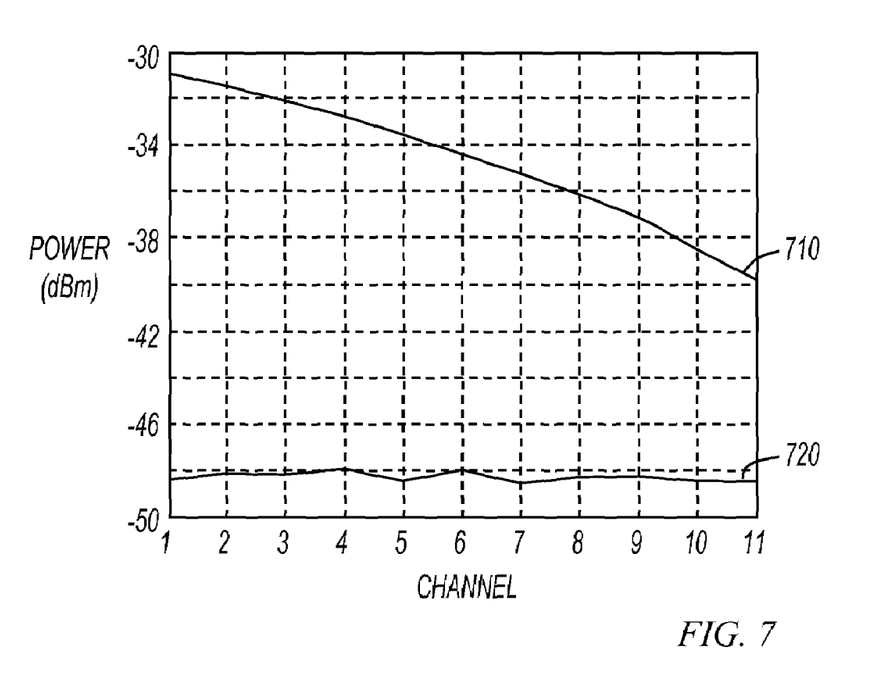
FIG. 7 shows a plot of noise power contributed by a serial link when a different serial link data rate is selected for each of the wireless channels in the ISM band.

FIG. 7 shows a plot of noise power contributed by a serial link when a different serial link data rate is selected for each of the wireless channels in the ISM band. Curve 710 shows the noise power present for a data rate of 2.5 GHz, and curve 720 shows the noise power present when data rates are chosen on a per-channel basis. For example, curve 720 corresponds to noise power contributed when the individual frequencies shown in Table 1 are used for each wireless channel in the ISM band.

TABLE 1

| | Channel | | | | | | | | | | |
|---|---|---|---|---|---|---|---|---|---|---|---|
| | 1 | 2 | 3 | 4 | 5 | 6 | 7 | 8 | 9 | 10 | 11 |
| Freq (MHz) | 2412 | 2417 | 2422 | 2427 | 2432 | 2437 | 2442 | 2447 | 2452 | 2457 | 2462 |
| Noise from 2.5 Gbps (dBm) | −31 | −31.5 | −32.1 | −32.8 | −33.6 | −34.4 | −35.3 | −36.1 | −37.1 | −38.5 | −39.8 |
| Individual Freq (MHz) | 2424 | 2429 | 2434 | 2439 | 2444 | 2449 | 2454 | 2459 | 2464 | 2469 | 2474 |
| Noise from Individual (dBm) | −48.4 | −48.1 | −48.2 | −47.9 | −48.4 | −47.9 | −48.6 | −48.3 | −48.3 | −48.4 | −48.4 |
| Noise Reduction (dB) | 17.4 | 16.6 | 16.1 | 15.1 | 14.8 | 13.5 | 13.3 | 12.2 | 11.2 | 9.9 | 8.6 |
| Grouped Freq (MHz) | | 2424 | | | | 2449 | | | | 2474 | |
| Noise from Grouped (dBm) | −48.4 | −47.1 | −45.2 | −45.6 | −47.6 | −47.9 | −46.8 | −45 | −45.7 | −47.5 | −48.4 |
| Noise Reduction (dB) | 17.4 | 15.6 | 13.1 | 12.8 | 14 | 13.5 | 11.5 | 8.9 | 8.6 | 9 | 8.6 |

In some embodiments, instead of changing PCI Express frequency for every one of the 11 channels, various channels are grouped, and one PCI Express frequency may be used for each channel in the group. For example, a set of {2.424, 2.449, 2.474} GHz may be utilized as shown in Table 1, above. These frequencies are 25 MHz apart, which is about 1% apart. They may be easier to synthesize with a PLL than the individual frequencies shown. As shown in Table 1, the first, second and third frequencies may be chosen for channel 1-3, 4-8, and 9-11, respectively. Other groupings are possible without departing from the scope of the present invention.

Figure 8:
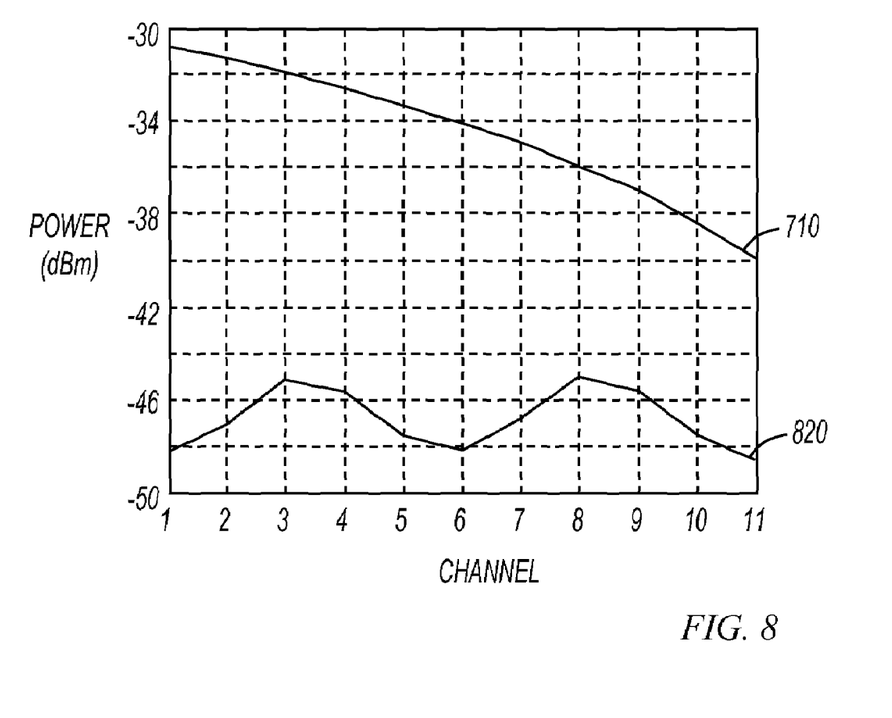
FIG. 8 shows a plot of noise power contributed by a serial link when a different serial link data rate is selected for each group of wireless channels in the ISM band.

FIG. 8 shows a plot of noise power contributed by a serial link when a different serial link data rate is selected for each group of wireless channels in the ISM band. Curve 710 shows the noise power present for a data rate of 2.5 GHz, and curve 820 shows the noise power present when data rates are chosen on a group basis as shown in Table 1. The average reduction in noise across the ISM band is 12.3 dB. For easier synthesis, a frequency set of 2.425, 2.45, 2.475 GHz can be chosen, because the result is not very sensitive to 1 MHz variations.

The serial link data rate changes may also be performed in other frequency bands. For example, serial data rates may be changed in the 802.11a band in Japan, which is around 4.9-5.0 GHz. In embodiments with wireless communications at 5.15-5.25 GHz, the PCI Express data rate can be changed to around 2.575-2.625 Gbps or 1.717-1.75 Gbps.

The above analysis ignores a potential source of noise right at the harmonics of the data rate. For example, for a 2.5 Gbps data transfer, there is spectrum energy at multiples of 2.5 GHz due to the clock duty cycle error. In a perfect 50% duty cycle clock, the data would have a perfect null at 2.5 GHz. However, the real world clock may have a duty cycle error spec of 10% (40 ps). The result is that the PCI express data spectrum has a non-zero spectral component at multiples of the data rate (2.5 GHz in this example).

If the sinc(x) null is moved to the channel center, and a non-zero spectral component exists because of duty cycle error, a harmonic spike may be moved to the channel center. It seems that the spike power will add to the noise and increase the total channel noise power; however, in embodiments that use convolutional encoding, the decoder may take into account the noise variance of each sub carrier, and the result is far less serious. The decoder may apply a lower confidence weight to the subcarrier in which the data rate harmonic resides. In the extreme situation, the receiver ignores the information sent by this subcarrier, which amounts to a loss of 1 out of 52 subcarriers in each channel. It is equivalent to a loss of 10*log 10(52/51)=0.08 dB. Including Inter Carrier Interference will degrade the performance slightly more.

When the PCI Express clock is spread, this harmonic spike may be quite wide, about 12.5 MHz for a 0.5% spread at 2.5 GHz. The spectrum null discussed in the previous paragraphs is then split by this noise spike into two nulls, one on each side of 2.5 GHz. The null steering techniques described herein may still be applied. For simplicity, these special cases are not described further.

Figure 9:
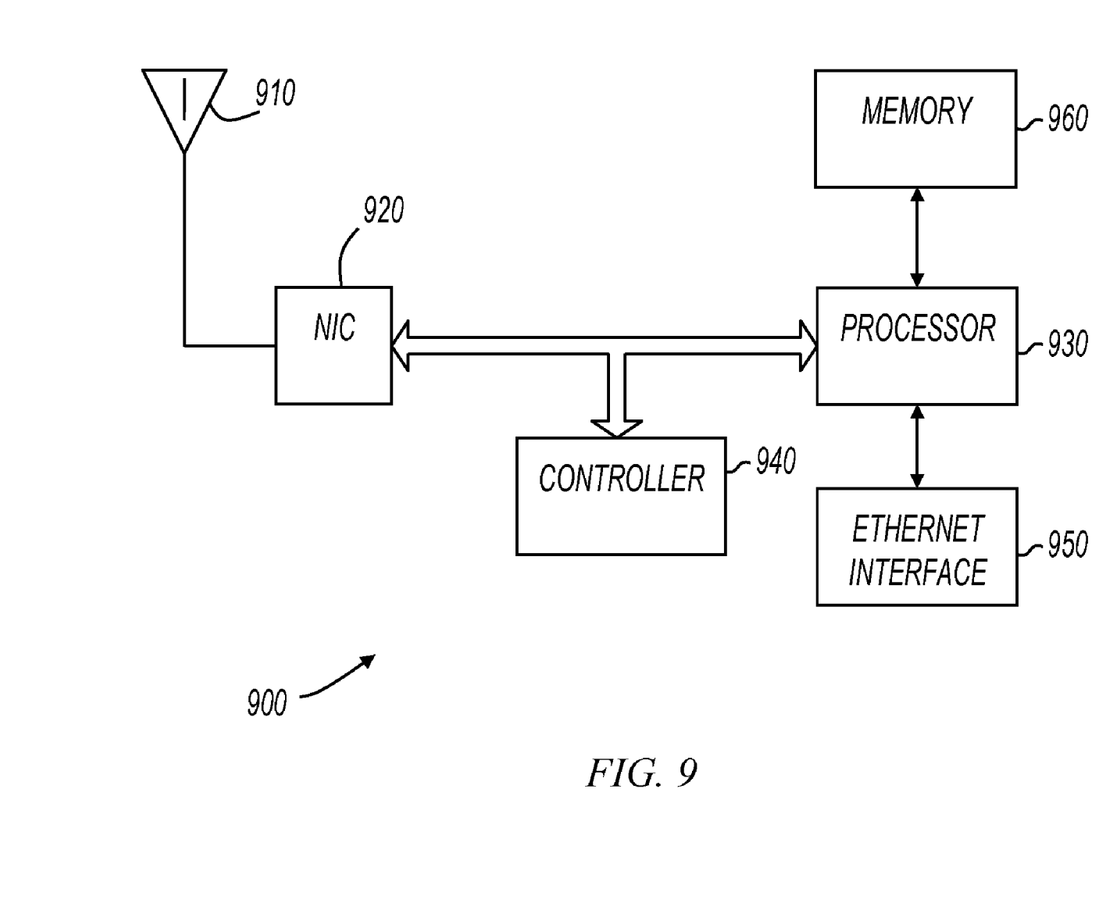
FIG. 9 shows a system diagram in accordance with various embodiments of the present invention.

FIG. 9 shows a system diagram in accordance with various embodiments of the present invention. Electronic system 900 includes antenna 910, network interface card 920, processor 930, memory 960, controller 940, and Ethernet interface 950. In some embodiments, electronic system 900 may be a computing platform that steers signal spectrum of a subsystem or peripheral device to reduce interference to wireless communications.

Antenna 910 may be a directional antenna or an omnidirectional antenna. As used herein, the term omni-directional antenna refers to any antenna having a substantially uniform pattern in at least one plane. For example, in some embodiments, antenna 910 may be an omni-directional antenna such as a dipole antenna, or a quarter wave antenna. Also for example, in some embodiments, antenna 910 may be a directional antenna such as a parabolic dish antenna or a Yagi antenna. In still further embodiments, antenna 910 includes multiple physical antennas. For example, in some embodiments, multiple antennas are utilized to multiple-input-multiple-output (MIMO) processing or spatial-division multiple access (SDMA) processing.

In operation, system 900 sends and receives signals using antenna 910, and the signals are processed by NIC 920. NIC 920 is coupled to antenna 910 to interact with other wireless devices. NIC 920 includes a wireless receiver that may be subject to platform noise as described above with reference to the previous figures. For example, a dot clock or a serial data link may introduce noise at a receiver within NIC 920. The noise may be coupled throughout, and is not limited to antennas, PCB traces, or ground planes.

Controller 940 is a controller device that may receive an indication of a current wireless channel and may change a frequency of operation to reduce interference to wireless communications. For example, in some embodiments, controller 940 may be a graphics controller that steers dot clock spectral components away from a current channel. Further, controller 940 may be a graphics controller that hops a dot clock between two frequencies that are chosen as a function of the current wireless channel.

In some embodiments, controller 940 may be an I/O controller or other serial link device. For example, controller 940 may be a PCI Express serial link device that receives an indication of a current wireless channel, and steers spectral energy that results from the PCI Express data signal away from a current channel. In various embodiments of the present invention, PCI Express spectral energy may be steered away from a current wireless channel by modifying a serial data rate to align a spectral null with the current wireless channel.

Figure 11:
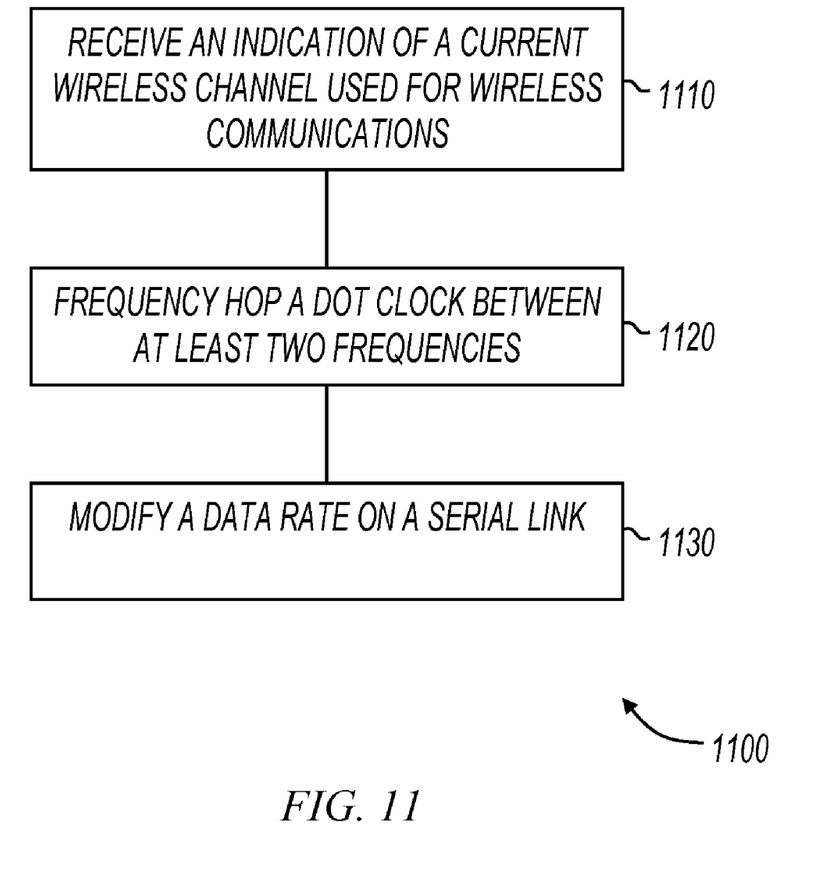
FIG. 11 shows a flowchart in accordance with various embodiments of the present invention.

Processor 560 may perform method embodiments of the present invention, or may program controller 540 to perform method embodiments of the present invention, such as method 1100 (FIG. 11). Processor 560 represents any type of processor, including but not limited to, a microprocessor, a digital signal processor, a microcontroller, or the like.

Memory 960 represents an article that includes a machine readable medium. For example, memory 960 represents any one or more of the following: a hard disk, a floppy disk, random access memory (RAM), dynamic random access memory (DRAM), static random access memory (SRAM), read only memory (ROM), flash memory, CDROM, or any other type of article that includes a medium readable by processor 930. Memory 960 may store instructions for performing the execution of the various method embodiments of the present invention. Further, memory 960 may also store data associated with the operation of system 900.

Ethernet interface 950 may provide communications between electronic system 900 and other systems. For example, in some embodiments, electronic system 900 may be a laptop computer that utilizes Ethernet interface 950 to communicate with a wired network. Some embodiments of the present invention do not include Ethernet interface 950. For example, in some embodiments, electronic system 900 may be a computing platform that does not include wired networking capabilities.

Figure 10:
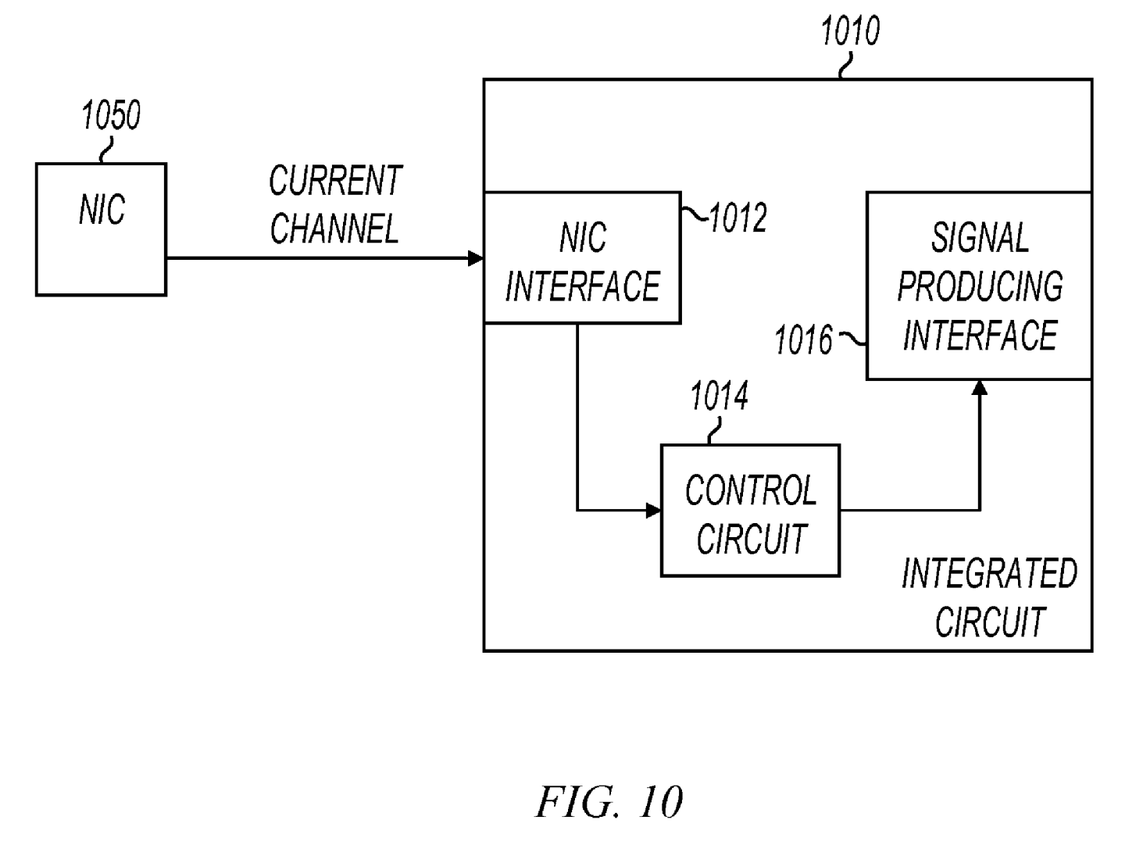
FIG. 10 show a diagram of an integrated circuit.

FIG. 10 shows an integrated circuit coupled to a network interface card (NIC). Integrated circuit 1010 includes NIC interface 1012, control circuit 1014, and signal producing interface 1016. In some embodiments, integrated circuit 1010 is a controller device such as controller 940 (FIG. 9), graphics controller 130 (FIG. 1), or I/O controller 140 (FIG. 1).

Integrated circuit 1010 communicates with NIC 1050 using NIC interface 1012. NIC interface 1012 may be any type interface capable of transferring current channel information from NIC 1050 to integrated circuit 1010. For example, in some embodiments, NIC interface 1012 may be one or more signal interconnects dedicated to sharing current channel information. In other embodiments, NIC interface 1012 may be a bus interface that communicates on a bus with many other devices, such as a processor or other controllers.

In operation, NIC interface 1012 receives current channel information from NIC 1050 and provides that information to control circuit 1014. In response to current channel information, control circuit 1014 causes signal producing interface 1016 to alter characteristics of one or more signals to reduce interference to NIC 1050. For example, signal producing interface may produce a dot clock for a display device, and control circuit 1014 may cause signal producing circuit 1016 to generate a dot clock that hops between two or more frequencies. Also for example, signal producing interface may source a serial data stream or clock signal, and control circuit 1014 may cause signal producing circuit 1016 to modify a serial link data rate to steer spectral energy away from the current channel.

Control circuit 1014 may be a dedicated control circuit capable of making decisions based on the current channel information. For example, in some embodiments, control circuit 1014 may be a state machine or microcontroller within integrated circuit 1010. Control circuit 1014 may also provide an interface external to integrated circuit to allow some control information to be provided from outside integrated circuit 1010. For example, control circuit 1014 may include memory-mapped registers that are writeable by a processor in a system. The registers may allow a processor to specify one or more frequencies to hop between or to select from. For example, a processor external to integrated circuit 1010 may specify dot clock frequencies to hop between, or may specify serial data rates to be used based on the current channel.

FIG. 11 shows a flowchart in accordance with various embodiments of the present invention. In some embodiments, method 1100 may be used to reduce the effects of platform noise on a wireless interface. In some embodiments, method 1100, or portions thereof, is performed by a controller device, a processor, a computing platform, or an electronic system, embodiments of which are shown in the various figures. Method 1100 is not limited by the particular type of apparatus, software element, or system performing the method. The various actions in method 1100 may be performed in the order presented, or may be performed in a different order. Further, in some embodiments, some actions listed in FIG. 11 are omitted from method 1100.

Method 1100 is shown beginning at block 1110 in which an indication of a current wireless channel used for wireless communications is received. This indication may be received by a controller device such as a graphics controller or I/O controller. In some embodiments, a NIC or other wireless interface provides the indication directly to the controller device, and in other embodiments, the indication may provided indirectly. For example, one or more signal lines may be coupled directly between a wireless interface and a controller device, or both may be coupled to a processor that reads the current channel indication from a NIC and writes it to a controller device.

At 1120, a dot clock is frequency hopped between at least two frequencies. In some embodiments, the dot clock frequencies are selected so that all dot clock harmonics are outside the current channel, and no channel is interfered by harmonics from both dot clock frequencies.

At 1130, a data rate of a serial link is modified. By modifying a data rate of a serial link, a null in the serial link spectrum may be steered to reduce interference with wireless communications. In some embodiments, a different data rate is chosen for each wireless channel. In other embodiments, wireless channels are grouped, and one data rate is selected for each group of channels. The serial link may be any type of link, including but not limited to a PCI Express link.

The actions of 1110 and 1120 are examples of modifying a signal frequency of a co-located signal source to reduce interference to wireless communications. For example, at 1110, a dot clock signal source is co-located with a wireless communications system, and the dot clock signal frequency is modified to reduce interference. Also for example, at 1120, a serial link source is co-located with a wireless communications system, and the serial link data rate is modified to reduce interference.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   receiving an indication of a current wireless channel used for wireless communications;
   selecting a first clock frequency having no harmonics in the current wireless channel;
   selecting a second clock frequency having no harmonics in the current wireless channel, and such that no other wireless channel contains harmonics from both the first and second clock frequencies; and
   modifying a signal frequency of a co-located signal source to reduce interference to the wireless communications in the current wireless channel, wherein modifying a signal frequency comprises frequency hopping the signal frequency between the first clock frequency and the second clock frequency.

2. The method of claim 1 wherein frequency hopping the signal frequency comprises frequency hopping a display dot clock.

3. A method comprising:
   receiving an indication of a current wireless channel used for wireless communications;
   selecting a first clock frequency having no harmonics in the current wireless channel;
   selecting a second clock frequency having no harmonics in the current wireless channel, and such that no other wireless channel contains harmonics from both the first and second clock frequencies; and
   modifying a data rate on a serial link to reduce interference to the wireless communications in the current wireless channel, wherein modifying a data rate comprises frequency hopping the data rate between the first clock frequency and the second clock frequency.

4. The method of claim 3 wherein modifying comprises modifying a data rate on a PCI Express link.

5. An apparatus comprising:
   a wireless local area network interface capable of communicating on a current channel; and
   a controller device to receive an indication of the current channel, to select first and second clock frequencies having no harmonics in the current channel and such that no other channel contains harmonics from both the first and second clock frequencies, and to modify a frequency of operation by frequency hopping between the first and second clock frequencies to reduce interference to the wireless local area network interface.

6. The apparatus of claim 5 wherein the controller device comprises a graphics controller.

7. The apparatus of claim 6 wherein the frequency of operation is a dot clock frequency.

8. The apparatus of claim 7 wherein the controller includes circuitry to provide a dot clock that hops between at least two frequencies.

9. The apparatus of claim 5 wherein the controller comprises an input/output (I/O) controller.

10. The apparatus of claim 9 wherein the frequency of operation is a data rate of serial link signals.

11. The apparatus of claim 5 wherein the controller includes a table of usable frequencies, where a number of usable frequencies is smaller than a number of wireless channels.

12. An integrated circuit comprising:
   a first interface to receive a current wireless channel number to indicate a current wireless channel being used in a wireless local area network;

a second interface to produce a signal; and a control circuit to determine two operating frequencies of the signal based at least in part on the current wireless channel number, where the two operating frequencies are chosen to reduce interference to the current wireless channel, such that no harmonics from the two operating frequencies appear in the current wireless channel and no other channel contains harmonics from both of the two operating frequencies.

13. The integrated circuit of claim 12 wherein the integrated circuit includes a graphics controller, and the signal produced by the second interface comprises a dot clock.

14. The integrated circuit of claim 13 wherein the graphics controller produces a dot clock that hops between the two operating frequencies.

15. The integrated circuit of claim 13 wherein the graphics controller produces a dot clock that slews between the two operating frequencies.

16. The integrated circuit of claim 12 wherein the integrated circuit includes a PCI Express circuit and the signal produced by the second interface comprises a serial data signal.

17. An electronic system comprising:
a wireless network interface to provide an indication of a current channel number;
a processor coupled to the wireless interface;
a controller device to receive the current channel number and alter a frequency of operation based on the channel number, wherein altering a frequency of operation comprises hopping between two operating frequencies such that no harmonics from the two operating frequencies appear in a current wireless channel corresponding to the current channel number and no other channel contains harmonics from both of the two operating frequencies; and
an Ethernet interface coupled to the processor.

18. The electronic system of claim 17 wherein the controller device comprises a graphics controller to receive the current channel number and provide a frequency hopping dot clock to reduce interference with the wireless network interface.

19. The electronic system of claim 17 wherein the controller device comprises a PCI Express device to receive the current channel number and modify a serial link data rate to reduce interference with the wireless network interface.

* * * * *